UNITED STATES PATENT OFFICE.

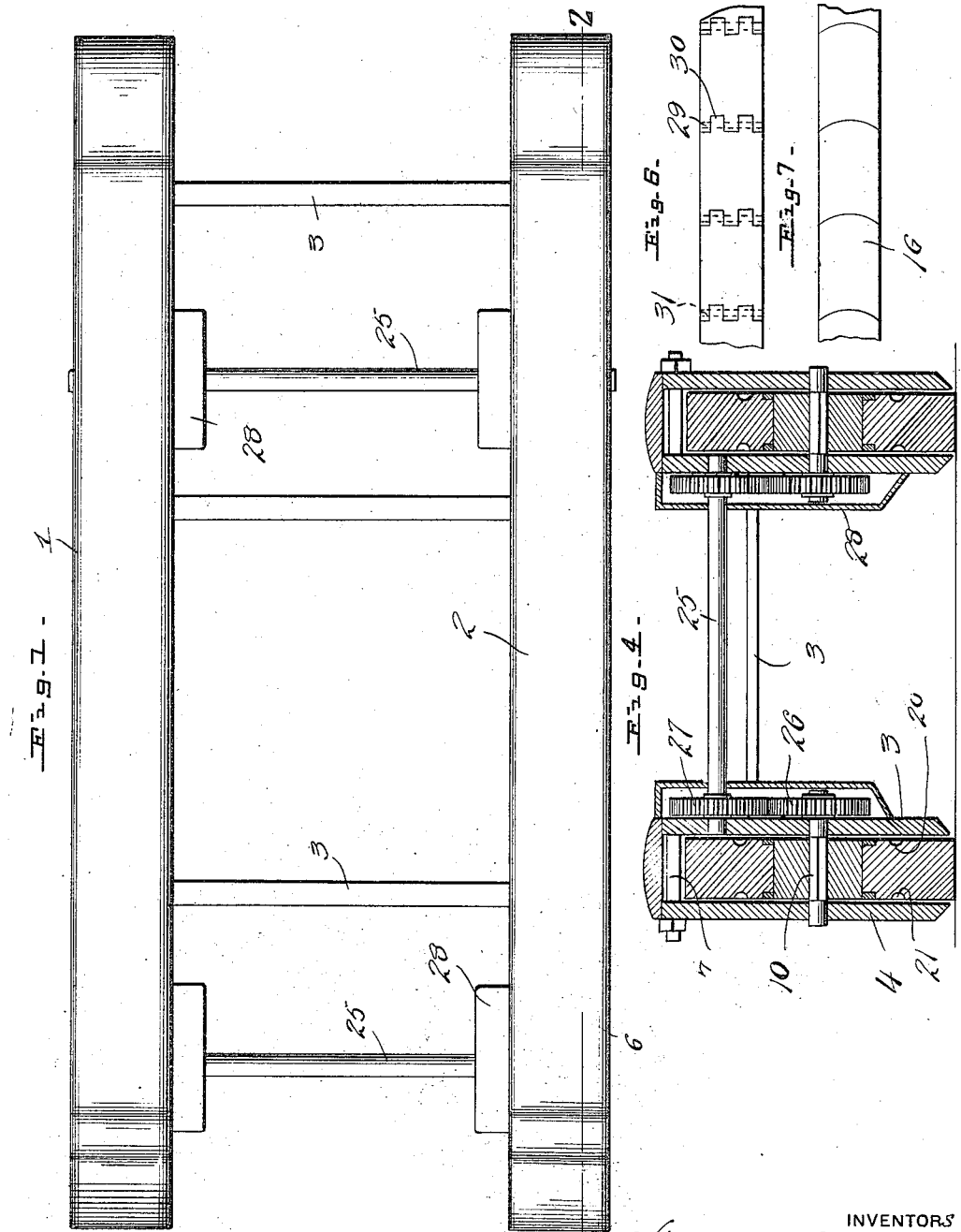

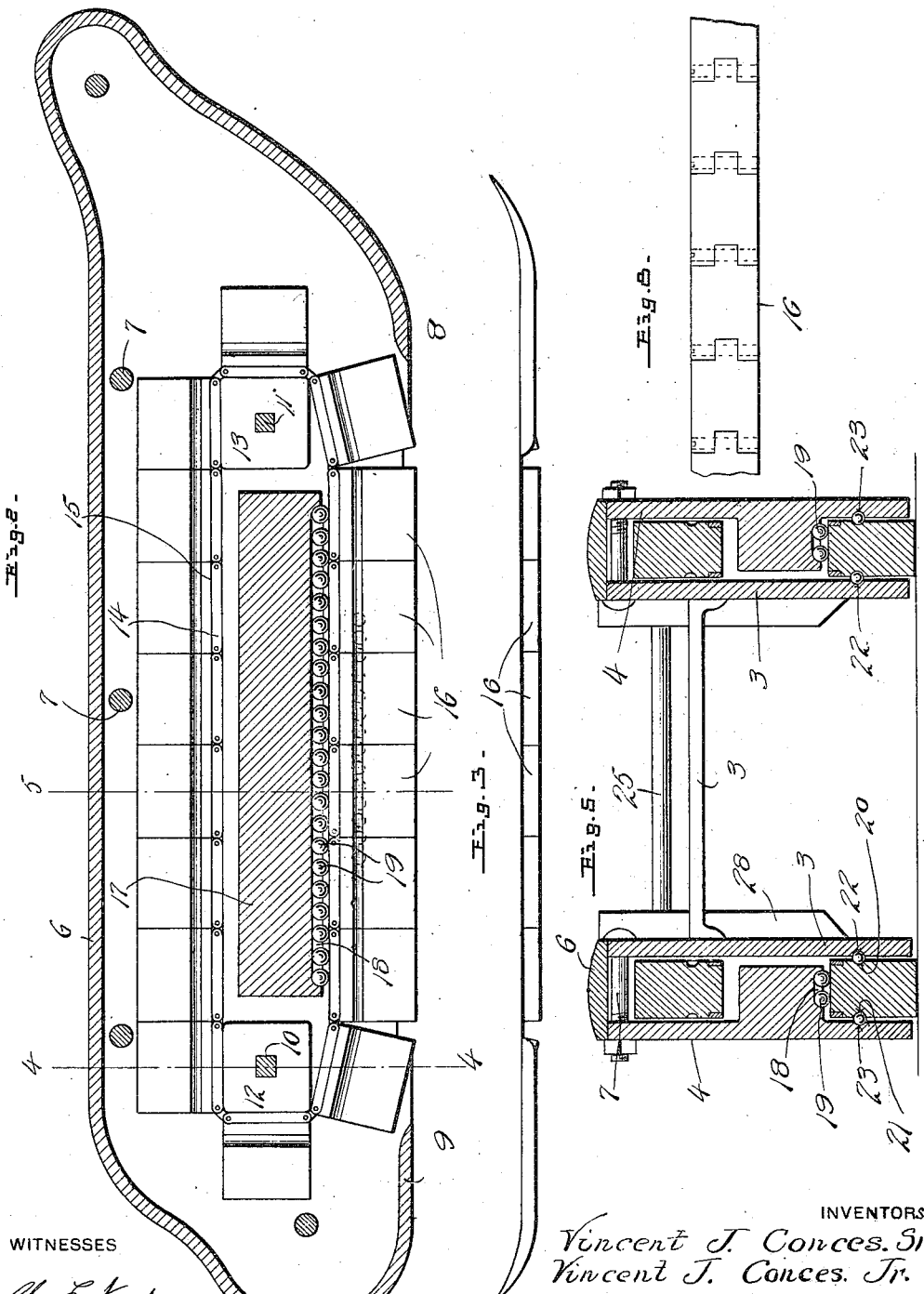

VINCENT J. CONCES, SR., AND VINCENT J. CONCES, JR., OF EAST CHICAGO, INDIANA.

SLED-RUNNER.

1,267,186.  Specification of Letters Patent.  Patented May 21, 1918.

Application filed May 11, 1916. Serial No. 96,898.

*To all whom it may concern:*

Be it known that we, VINCENT J. CONCES, Sr., and VINCENT J. CONCES, Jr., citizens of the United States, residing at East Chicago, in the county of Lake and State of Indiana, have invented certain new and useful Improvements in Sled-Runners, of which the following is a specification.

This invention relates to an improvement in auto-sleds, and more particularly to a traction runner by which driving power is applied to move the vehicle.

An object of this invention is to provide a runner which is fitted with means by which tractive force may be applied to drive the runner over ice and snow or a bare road or pavement with equal facility, and which has the parts thereof so formed that a broad and extensive bearing surface is provided at all times for the transmission runner.

A further object is to so construct the parts that the drive may be accomplished to any suitable power mechanism mounted on the vehicle, and to provide anti-friction bearing means on the load bearing parts of the structure to relieve friction at these points.

A still further object by so constructing the driving parts that a smooth, creeping or sliding action is accomplished and the possibility of jogging through uneven operation of the driving means is eliminated.

With the above and other objects in view, my invention consists in such novel features of construction and combination of parts which will be hereinafter set forth in connection with the drawings and then more fully pointed out in the claim.

In the drawings:

Figure 1 is a top plan view of a pair of traction runners constructed in the manner of this invention.

Fig. 2 is a longitudinal sectional view taken on the line 2—2 of Fig. 1 showing the internal mechanism of one of the runners.

Fig. 3 is a fragmentary detail in side elevation of the lower edge of one of the runners.

Fig. 4 is a transverse sectional view taken on the line 4—4 of Fig. 2.

Fig. 5 is a central view similar to Fig. 4 taken on the line 5—5 of Fig. 2.

Fig. 6 is a detail view showing a top plan, a modified form of the runner.

Fig. 7 is a view of the structure shown in Fig. 6 illustrating the bearing face thereof.

Fig. 8 is a view similar to Fig. 6 showing another modified form of the same runner.

It is a purpose of this invention that the structure may be constructed in connection with a pair of runners adapted to be considered as one of the running units of a vehicle of the bob-sled type, and this set of runners might be fitted at the rear with a set of plain runners on the forward part of the frame arranged to be turned to accomplish the desired steering of the vehicle as it is moved forwardly or rearwardly although it will be understood that the forward runners may likewise be constructed to apply tractive force. As the invention resides particularly in the construction and arrangement of the parts of the traction runners, we have not herein shown any particular application to a vehicle and it is, of course, to be understood under some circumstances a single set of runners might be fitted to carry a body and a single runner or a pair of runners might be fitted to be capable of turning movement to accomplish the steering action.

As is illustrated in the drawings, the runners 1 and 2 are mounted in parallel arrangement and are held in the proper relation by the cross frame members 3, which cross frame members are preferably of a length to space the runners apart to get the standard tread gage for vehicles. Each of the runners 1 and 2 is made up of the side portions 4 and 5 which are formed to give the desired shape to the runners and these side members are spaced apart, the cover strip 6 being provided to extend along over the top of the side members and down over the front and rear end thereof to form a casing within these runners, and the bolts or other suitable fastening means indicated at 7 being provided to secure the side members 4 and 5 in the proper mounting.

The cover strip 6 is extended slightly around the lower edges of the side members 4 and 5 to form the gliding tread 8 and 9 adjacent the forward and rear end of the runner, and the space between these portions 8 and 9 is left without covering, to thus provide a slotted opening. The driving shafts 10 and 11 are mounted across between the sides 4 and 5 adjacent the rear and forward ends of the runner, and these drive shafts in their central portion are squared or are provided with splines so that the squared driving blocks 12 and 13 will be held to turn therewith. The shafts 10 and 11 are preferably mounted well down in the casings forming each of the runners and bearing blocks 16 are connected with the links 15 of the chain 14 in such relation that as the driving shafts are rotated, these bearing blocks 16 will have movement through the slotted opening between the portions 8 and 9.

A supporting block 17 is mounted between the sides 4 and 5 of each of the runners and on its lower face is provided with a ball race 18 in which the bearing balls 19 are mounted to have bearing engagement against the inner faces of the blocks 16, thus holding these blocks in relation to project slightly below the portions 8 and 9 of the runner casings so that a tread surface is formed. The bearing or tread blocks 16 have the ball races 20 and 21 formed in the sides thereof so that as these blocks are held in the proper relation by the engagement with the bearing balls 19, the respective ball races on the sides of the several blocks commencing in the slotted openings between the portions 8 and 9 will be in alinement, and the sides 4 and 5 of the casings are provided with the ball races 22 and 23 which have the bearing balls mounted therein to work in the races 20 and 21 of the tread block 16. The races 22 and 23 are made of the proper extent that the tread block 16 will be brought to the proper alinement before moving to pass the bearing balls 24, and thus there will not be binding action to the parts and at the same time the bearing balls 24 will reduce side friction between the blocks 16 and the side members 4 and 5 forming the runner casing.

While the driving blocks 12 and 13 have been described as being square, it is to be understood that driving blocks of any other polygonal form might be employed, so long as the respective sides thereof are equal and the driving shafts 10 and 11 are mounted in about the center of the block, and it will be noted that when the corners are brought to positioning below the drive shafts and in vertical alinement with the turning centers of the shaft, the upper and lower extent of the chain 14 will be raised and lowered beyond the relative position of these portions of the chain as shown in Fig. 2, and consequently the supporting block 17 is placed sufficiently low down that it will hold the lower extent of the chain 14 in substantially the positioning to which it is carried by the extension thereof at the cornice of the blocks as the blocks are turned. By arranging the parts in such relation the lower extent of the chain is at no time given greater downward movement by the turning of the drive blocks 12 and 13; the tread blocks 16 which are backed up by the bearing balls 19 will at all times travel in a smooth gliding path, and as a consequence these tread blocks will at all times be presented to the slotted bottoms of the runners to extend slightly below the portions 8 and 9. If desired, the tread faces of the bearing block 16 may be fitted with wear plates, the faces of the blocks may be roughened, or any other expedient may be resorted to which will condition the tread faces of the blocks for most expedient operation for the particular connection in which the runners are to be used.

Shafts 10 and 11 are mounted relatively low down and any power connection made therewith will be likely to strike road obstructions and become damaged, and for this reason we provide the power shaft 25 mounted across between the runners 1 and 2 above the mounting of the drive shafts 10 and 11. Gear wheels 26 are mounted on the end of the drive shafts 10 and 11 and the power shafts 25 have gears 27 carried on the end thereof to connect with the gears 26 so that as turning movement is given to the power shaft 25, the drive shaft of each of the runners of the sled will be turned to cause the proper movement to be given to the blocks 16 which are in the bearing relation. With the arrangement of the parts as has been described, power may be connected directly to the power shaft 25, although it will of course be understood that a pair of shafts might be provided or that a differential might be connected in the train of transmission mechanism from the power plant to the power shaft 25, thus permitting the proper variations in the speed of travel of the bearing blocks 16 when the vehicle is being turned. It is preferable that casings 28 be mounted over the gear wheels 26 and 27 so that these gears will be protected and will be covered to exclude snow, mud, etc.

As has been stated heretofore, a pair of runners as described may be fitted in any desired manner in the operative relation, and for this reason we have not shown any specific mounting of the parts, although it will of course be understood that it is preferable that a connection be formed with the frame or body of the vehicle which will permit the runners to have slight rocking or swinging movement to compensate for irregularities in the surface over which the runners are traveling, and it will be understood that any form of spring or other connection may be fitted in conjunction with the mounting for the runners.

In Fig. 6 we have shown a slightly modified form of chain runner, in which the bearing blocks 16 are provided with tenons 29 and 30 which are spaced apart to be interfitted and are provided with transversely alined orifices in which the pivot pins 31 are fitted after the manner of fitting in a hinged joint, and thus the several blocks are connected together without the necessity of employing the links 15 forming the chain 14. To give a better tread surface for the bearing blocks 16, it is preferable that each of the blocks be made slightly concave on one end and slightly convex on the other end so that as the blocks are fitted together they will occupy the relation shown in Fig. 7 and a smoother joint will be presented on the tread surface. In Fig. 8, a form of chain runner differing slightly from the form illustrated in Fig. 6 is shown, and in this modification the tenons of the several blocks are made fewer in number, the main structure and the principles of operation, however, being identical with the disclosure shown in Fig. 6. In connection with the chain runners, it will be noted that a number of modifications might be resorted to without any material change in the efficiency of the device.

While we have herein shown and described only one specific form of the main structure and only such forms of runner chains which might be adopted, it will be understood that various changes and modifications might be resorted to in the form and arrangement of the parts without departing from the spirit and scope of our invention, and hence we do not wish to be limited to the exact disclosure but only to such points as may be set forth in the claim.

We claim:

A sled runner comprising a casing having a slotted opening in the bottom thereof, a centrally and longitudinally arranged partition therein, an endless traction element mounted for movement in said casing and adapted to project through said opening, said partition forming a bearing for the traction element, the partition having at its under side a race which is closed at its end, and anti-friction devices located in the race and engaged by the lower run of said traction element.

In testimony whereof we affix our signatures in presence of two witnesses.

VINCENT J. CONCES, Sr.
VINCENT J. CONCES, Jr.

Witnesses:
A. P. Ross,
Wm. J. Ambey, Jr.

Copies of this patent may be obtained for five cents each, by addressing the "Commissioner of Patents, Washington, D. C."